(12) United States Patent
Richter et al.

(10) Patent No.: US 12,233,582 B2
(45) Date of Patent: Feb. 25, 2025

(54) FOAMING OF BLOWING AGENT CONTAINING POLYMERS THROUGH THE USE OF MICROWAVES

(71) Applicant: Evonik Operations GmbH, Essen (DE)

(72) Inventors: Thomas Richter, Darmstadt (DE); Christoph Seipel, Babenhausen (DE); Christian Traßl, Warmensteinach (DE); Andreas Liebe, Darmstadt (DE); Florian Becker, Darmstadt (DE); Vincent Ma Junyong, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 333 days.

(21) Appl. No.: 17/423,152

(22) PCT Filed: Dec. 19, 2019

(86) PCT No.: PCT/EP2019/086245
§ 371 (c)(1),
(2) Date: Jul. 15, 2021

(87) PCT Pub. No.: WO2020/148066
PCT Pub. Date: Jul. 23, 2020

(65) Prior Publication Data
US 2022/0126490 A1 Apr. 28, 2022

(30) Foreign Application Priority Data
Jan. 16, 2019 (EP) .................................. 19152184

(51) Int. Cl.
*B29C 44/34* (2006.01)
*B29C 35/08* (2006.01)

(52) U.S. Cl.
CPC ...... *B29C 44/3415* (2013.01); *B29C 35/0805* (2013.01); *B29C 2035/0855* (2013.01)

(58) Field of Classification Search
CPC ............ B29C 44/3415; B29C 35/0805; B29C 2035/0855
See application file for complete search history.

(56) References Cited

U.S. PATENT DOCUMENTS

| | | | |
|---|---|---|---|
| 3,216,849 A * | 11/1965 | Jacobs | B29C 44/60 521/915 |
| 3,627,711 A | 12/1971 | Schroeder et al. | |
| 4,139,685 A | 2/1979 | Schroeder | |
| 4,334,971 A | 6/1982 | Mahnke et al. | |
| 4,578,231 A | 3/1986 | Molteni | |
| 4,740,530 A | 4/1988 | Pip | |
| 4,996,109 A | 2/1991 | Krieg et al. | |
| 5,064,867 A | 11/1991 | Barringer et al. | |
| 8,080,592 B2 | 12/2011 | Kruper, Jr. et al. | |
| 10,207,435 B2 | 2/2019 | Bernhard et al. | |
| 10,343,314 B2 | 7/2019 | Bernhard et al. | |
| 10,584,225 B2 | 3/2020 | Richter et al. | |
| 10,597,531 B2 | 3/2020 | Prissok et al. | |
| 10,619,024 B2 | 4/2020 | Richter et al. | |
| 10,954,319 B2 | 3/2021 | Richter et al. | |
| 2002/0117769 A1 | 8/2002 | Arch et al. | |
| 2004/0235973 A1 | 11/2004 | Stein et al. | |
| 2006/0210785 A1 | 9/2006 | Takada et al. | |
| 2014/0051777 A1 | 2/2014 | Zorn et al. | |
| 2015/0014607 A1 | 1/2015 | Kaneko et al. | |
| 2015/0352759 A1 | 12/2015 | Van Luck | |
| 2016/0039986 A1 | 2/2016 | Zimmermann et al. | |
| 2016/0332344 A1 | 11/2016 | Bernhard et al. | |
| 2017/0087750 A1 | 3/2017 | Bernhard et al. | |
| 2017/0136665 A1 | 5/2017 | Bernhard et al. | |
| 2018/0079882 A1 * | 3/2018 | Richter | C08K 3/36 |
| 2018/0215063 A1 * | 8/2018 | Richter | B26D 1/54 |
| 2019/0153186 A1 | 5/2019 | Richter et al. | |
| 2019/0211124 A1 | 7/2019 | Richter et al. | |
| 2022/0063153 A1 * | 3/2022 | Richter | B29C 44/3415 |

FOREIGN PATENT DOCUMENTS

| | | |
|---|---|---|
| CN | 1483059 | 3/2004 |
| CN | 1281401 C | 10/2006 |
| CN | 105073371 | 11/2015 |
| CN | 205167373 U | 4/2016 |
| CN | 104602802 | 5/2016 |
| CN | 106459465 | 2/2017 |
| CN | 107698976 | 2/2018 |
| DE | 1817156 | 7/1970 |
| DE | 27 26 259 | 11/1985 |
| DE | 10 2013 223347 | 5/2015 |
| EA | 030878 | 10/2018 |
| EP | 0 048 119 A2 | 3/1982 |
| EP | 0 048 119 A3 | 3/1982 |

(Continued)

OTHER PUBLICATIONS

Lin Tao, Common Knowledge Evidence 1: "Cross-Century High-Efficiency High-Tech", Popular Science Press, Dec. 1993, with partial English translation, p. 218.
Goldmann et al., U.S. Appl. No. 18/250,824, filed Apr. 27, 2023.
U.S. Appl. No. 18/250,824, filed Apr. 27, 2023, Goldmann et al.
International Search Report dated Jan. 17, 2020, in PCT/EP2019/086250, 3 pages.
Written Opinion dated Jan. 17, 2020, in PCT/EP2019/086250, 4 pages.
Traßl et al., U.S. Appl. No. 18/255,409, filed Jun. 1, 2023.
Chinese Office Action dated Jul. 19, 2023, in Chinese Application No. 201980088967.0, with English translation, 19 pages.

(Continued)

*Primary Examiner* — Mathieu D Vargot
(74) *Attorney, Agent, or Firm* — Grüneberg and Myers PLLC

(57) ABSTRACT

(Rigid) foams can be produced by heating a blowing agent containing polymers through the combination of thermal energy with irradiation by microwaves.

11 Claims, No Drawings

(56) References Cited

FOREIGN PATENT DOCUMENTS

| | | |
|---|---|---|
| EP | 0 037 470 | 6/1985 |
| EP | 0 259 706 A2 | 3/1988 |
| EP | 0 259 706 A3 | 3/1988 |
| EP | 0 356 714 | 3/1992 |
| EP | 2 441 794 A2 | 4/2012 |
| EP | 2 441 794 A3 | 4/2012 |
| EP | 3 075 769 | 10/2016 |
| EP | 3 075 770 | 10/2016 |
| EP | 3 277 748 | 10/2016 |
| JP | S59-184630 | 10/1984 |
| JP | 60-262835 | 12/1985 |
| JP | S63-074629 | 4/1988 |
| KR | 20030059827 | 7/2003 |
| RU | 2482139 | 5/2013 |
| RU | 2015147264 | 5/2017 |
| WO | 03/037598 A2 | 5/2003 |
| WO | 03/037598 A3 | 5/2003 |
| WO | 2013/146925 | 10/2013 |
| WO | 2015/071239 | 5/2015 |
| WO | 2016/146395 | 9/2016 |
| WO | 2016/156172 | 10/2016 |
| WO | 2018/046380 | 3/2018 |
| WO | 2018/095760 | 5/2018 |
| WO | 2020/148066 | 7/2020 |
| WO | 2020/148067 | 7/2020 |
| WO | 2021/023432 | 2/2021 |
| WO | 2022/037857 | 2/2022 |
| WO | 2022/0378857 | 2/2022 |

OTHER PUBLICATIONS

Zhang et al., "Polyimide Foam Materials", Beijing: National Defense Industry Press, Nov. 2018, p. 134.
Zhou et al., "Polymer Material Forming Processing", Beijing: China Light Industry Press, May 2000, pp. 364-365.
U.S. Appl. No. 17/310,059, filed Jul. 14, 2021, 2022/0063153, Richter et al.
U.S. Appl. No. 18/255,409, filed Jun. 1, 2023, Traßl, et al.
International Search Report issued Jan. 17, 2020 in PCT/EP2019/086245, 5 pages.
Written Opinion issued Jan. 17, 2020 in PCT/EP2019/086245, 5 pages.
Richter et al., U.S. Appl. No. 18/412,259, filed Jan. 12, 2024.
U.S. Appl. No. 18/412,259, filed Jan. 12, 2024, Richter et al.
U.S. Appl. No. 18/041,771, filed Feb. 15, 2023, Traßl et al.

* cited by examiner

FOAMING OF BLOWING AGENT CONTAINING POLYMERS THROUGH THE USE OF MICROWAVES

CROSS-REFERENCE TO RELATED APPLICATIONS

This application is the National Stage entry under § 371 of International Application No. PCT/EP2019/086245, filed on Dec. 19, 2019, and which claims the benefit of priority to European Application No. 19152184.8, filed on Jan. 16, 2019. The content of each of these applications is hereby incorporated by reference in its entirety.

BACKGROUND OF THE INVENTION

Field of the Invention

The invention relates to the production of (rigid) foams by heating of blowing agent containing polymers through the combination of thermal energy with irradiation by microwaves.

DESCRIPTION OF RELATED ART

Foaming processes for polymers for producing (rigid) foams are common knowledge. Known processes include inter alia continuous extrusion processes in which polymers are melted in an extruder and loaded with blowing agent to undergo foaming upon discharging from the nozzle as a result of the pressure drop. Also known are particle foaming processes in which blowing agent containing polymer granulates are foamed in a mould by the action of energy (thermal, steam) and batch processes in which polymers are loaded under pressure with for example $CO_2$ or $N_2$ under supercritical conditions and undergo foaming upon pressure reduction. Also known are block foam processes in which polymers containing blowing agents are softened by heating above the glass transition temperature in an oven and undergo foaming as a result of the blowing agent present therein.

The abovementioned block foam processes in which a polymer sheet containing blowing agents is thermally heated above the $T_g$ of the polymer are used inter alia for producing PMI- or PMMA-based rigid foams (DE2726259, DE1817156, EP3277748). One reason for the use of these materials is the good adjustability of the density of the obtained foams via the foaming temperature/the foaming duration. Furthermore, the abovementioned rigid foams based on PMI or PMMI are not obtainable economically by other production processes since as a result of their high molecular weights, important for mechanical properties, they are not producible by extrusion processes.

Microwave technologies are used in the production of foams only to a very limited extent, for example in the production of elastic melamine foams. Here, a liquid melamine-formaldehyde pre-condensate is heated using microwave radiation and thus foamed and crosslinked (EP0037470).

EP3277748 describes fine-celled PMMA foams and the production thereof. Suitable nucleating agents are provided in particular. It describes a classical foaming process through the supply of thermal energy. It is mentioned that blowing agent containing PMMA cast polymers are also foamable with a combination of thermally supplied energy in conjunction with microwaves. However no further details of such a process are disclosed.

SUMMARY OF THE INVENTION

Problem

The problem addressed was that of developing an economic process for foaming (rigid) foams.

An economic foaming process for producing rigid foam blocks which due to the high molar masses of their matrix polymer cannot be produced by extrusion processes for example (for example PMI- and PMMA-based foams) was to be developed.

The rigid foam blocks are preferably produced from polymer sheets obtained by a casting polymerization process in which blowing agent is added to the monomer solution before polymerization. In order to foam these blowing agent containing polymer sheets they must be heated above the boiling point/decomposition point of the blowing agents present and simultaneously above the glass transition temperature of the polymer. A purely thermal heating in an oven has the disadvantage that the energy input into the polymer takes place purely by convection and conduction of thermal energy. This process may take 2-3 hours since plastics are per se poor thermal conductors and the foam temperature in the core of the polymer sheets is thus achieved only slowly. Furthermore, the foaming polymer insulates itself with respect to the oven temperature.

The objective was to markedly shorten this process and thus make the foaming process more economic.

SOLUTION

It was found that foaming times may be drastically shortened when in addition to purely thermal energy input during heating energy in the form of microwave radiation is also supplied.

The problem is solved by a process for producing (rigid) foams, characterized in that the blowing agent containing polymer composition is foamed in an apparatus consisting of a thermal heating means and a microwave, which in combination heat the polymer composition above the glass transition temperature $T_{gC}$.

DETAILED DESCRIPTION OF THE INVENTION

Suitable high-temperature polymers for producing rigid foams include in particular those having a glass transition temperature $T_{gP}$ between 180° C. and 235° C. Materials having a lower glass transition temperature are often not suitable for fulfilling the desired profiles of properties of a high-temperature foam. By contrast, materials with higher $T_{gP}$ values are scarcely available. According to the invention the definition of the glass transition temperature relates to the most relevant (energetically greatest) thermal transition of a material. This means it is quite possible that the material also has a second thermal transition below 210° C. This occurs for example in phase separating systems, in particular in polymer blends (polymer mixtures).

For materials for which no clearly disclosed glass transition temperature is known, said temperature may be determined by DSC (differential scanning calorimetry). In this regard, a person skilled in the art is aware that DSC is only sufficiently conclusive when, after a first heating cycle up to a temperature which is a minimum of 25° C. above the highest glass transition or melting temperature but at least 20° C. below the lowest decomposition temperature of a material, the material sample is kept at this temperature for at least 2 min. The sample is then cooled back down to a temperature at least 20° C. below the lowest glass transition or melting temperature to be determined, wherein the cooling rate should be not more than 20° C./min, preferably not more than 10° C./min. This is then followed after a further wait time of a few minutes by the actual measurement in which the sample is heated at a heating rate of generally 10° C./min or less to at least 20° C. above the highest melting or glass transition temperature.

Further performance of DSC, for example in relation to sample preparation, may be performed by the person skilled in the art according to DIN EN ISO 11357-1 and ISO 11357-2. DSC is per se a very stable method which can result in greater variances in measured results only in the case of deviations from the temperature programme.

According to the invention the term (rigid) foams is to be understood as meaning artificially produced substances having a cellular structure and a low density. This comprises thermoplastic foams (for example polystyrene, PP, PVC), elastomeric foams (for example flexible PUR foams) but also thermosetting foams (for example rigid PUR foams). According to the invention, said term is preferably to be understood as meaning PMI (polymethacrylimide) and PMMA (polymethyl methacrylate) foams. Polysulfone and poly(ether)imide foams are likewise suitable.

Rigid foams preferred according to the invention have a density below 800 kg/m$^3$, in particular between 25 and 500 kg/m$^3$, particularly preferably between 50 and 300 kg/m$^3$.

The glass transition temperature $T_g$ depends on various factors. Every polymer, without additives and in particular without blowing agent, has a specific glass transition temperature $T_{gP}$. The addition of additives causes the glass transition temperature of the polymer composition $T_{gC}$ to change.

It has now been found that particularly good (rigid) foams are obtained when the blowing agent containing polymer composition is heated above the glass transition temperature $T_{gP}$ of the pure polymer with microwave irradiation and thermal energy before foaming.

It has also been found that good results are achieved when the temperature of the thermal heating means is not more than 30° C. below the glass transition temperature of the polymer $T_{gP}$ before foaming. The required energy input to achieve the glass transition temperature may be supplemented by the microwave radiation. This results in a substantially better heat distribution in the polymer composition and thus in surprisingly homogeneous foams.

It is particularly preferable when the temperature of the thermal heating means is not less than 30° C. below the glass transition temperature of the polymer $T_{gP}$ while simultaneously the temperature of the polymer composition during the foaming operation corresponds at least to the glass transition temperature of the polymer composition $T_{gC}$.

The blowing agent containing polymer composition is typically obtained from monomer mixtures by sheet polymerization. For example PMMA sheet polymers are produced from a monomer mixture containing predominantly MMA (methyl methacrylate) or a syrup of a polymer consisting predominantly or entirely of MMA and a monomer mixture composed predominantly or entirely of MMA in the presence of a blowing agent non-gaseous under polymerization conditions and a nucleating agent.

The nucleating agent is silicon oxide particles having a diameter between 4 and 1000 nm. This composition contains 0.01% to 2.0% by weight, preferably 0.2% to 1.5% by weight, of one or more initiators, 2% to 20% by weight, preferably 3% to 15% by weight, of one or more blowing agents, 0.2% to 10% by weight, preferably 0.5% to 8% by weight, of the silicon oxide particles having a diameter between 4 and 1000 nm, preferably between 5 and 500 nm, and 70% to 97.79% by weight, preferably 75% to 97.8% by weight, of a polymer-forming mixture, wherein this polymer-forming mixture consists to an extent of at least 75 mol % of MMA or MMA repeating units and may be present to an extent of 0% to 80% by weight, preferably to an extent of 0% to 50% by weight, in the form of polymer and/or oligomer. This composition is initially polymerized at a temperature between 20° C. and 100° C., preferably between 30° C. and 70° C.

In addition to the recited components, the composition may contain up to 27.79% by weight of further components. Examples of these further components are in particular further polymer components distinct from MMA containing polymers, UV stabilizers, fillers and pigments. Further customary additives such as for example crosslinkers, chain-transfer agents, release agents and many more may be present.

In addition to MMA the polymer-forming mixture may include up to 25% by weight of further components. These further components may comprise MMA-copolymerizable monomers, chain-transfer agents and/or crosslinkers. The MMA and the copolymerizable monomers may be employed entirely in the form of monomers. The polymer-forming composition may in particular contain up to 0.5% by weight of crosslinker and/or up to 1.5% by weight of chain-transfer agent.

In a more conveniently handleable embodiment of the invention, however, it is also possible for up to 80% by weight, preferably not more than 50% by weight, of the MMA and the copolymerizable monomers to be present in the form of polymer and/or oligomer. The advantage of such a syrup, consisting of monomers and polymers/oligomers, is that it has a higher viscosity than a pure monomer mixture and develops a lower vapour pressure in the polymerization.

The MMA-copolymerizable monomers may be in particular acrylates, such as, in particular, methyl acrylate, ethyl acrylate, propyl acrylate or n-butyl acrylate. The copolymerization of acrylates serves to additionally stabilize the foam at high foaming temperatures in particular, since these foaming temperatures may be above the ceiling temperature of the pure MMA. When no stabilizing comonomers are incorporated, a shorter foaming time is preferable.

Further examples of suitable comonomers are (meth) acrylic acid, methacrylates, such as ethyl methacrylate, propyl methacrylate, n-butyl methacrylate, tert-butyl (meth) acrylate, isopropyl (meth)acrylate, isobutyl (meth)acrylate, styrene, (meth)acrylamide, an N-alkyl(meth)acrylamide having one to 12 carbon atoms in the alkyl group, a hydroxyalkyl (meth)acrylate having one to 4 carbon atoms in the alkyl group, a polyether (meth)acrylate where the polyether may have a molecular weight between 200 and 5000. These comonomers may also take the form of a mixture of two or more thereof. When these comonomers are n-butyl (meth)acrylate and/or n-propyl (meth)acrylate, the proportion thereof in the overall composition should not exceed a combined 3% by weight.

The notation "(meth)acrylate" here means both methacrylate, for example methyl methacrylate, ethyl methacrylate, etc., and acrylate, for example methyl acrylate, ethyl acrylate, etc., and mixtures of the two.

When crosslinkers are employed these are preferably a di-, tri- or tetra(meth)acrylate, allyl (meth)acrylate, triallyl cyanurate, triallyl isocyanurate or a mixture containing at least two of these crosslinkers.

When chain-transfer agents are employed these are preferably a compound having one to five mercaptan groups, a γ-terpinene or a mixture of at least two of these chain-transfer agents. The chain-transfer agent is particularly preferably pentaerythritol tetrathioglycolate, 2-mercaptoethanol, an alkyl mercaptan having 2 to 12 carbon atoms, thioglycolic acid, a thioglycolate, γ-terpinene or a mixture of at least two of these chain-transfer agents.

Especially suitable blowing agents are tert-butanol, n-heptane, MTBE, methyl ethyl ketone, an alcohol having from one to four carbon atoms, water, methylal, urea, isopropyl (meth)acrylate and/or tert-butyl (meth)acrylate. When isopropyl (meth)acrylate and/or tert-butyl (meth)acrylate are used they are at the same time a constituent of the recited monomer composition and are initially entirely or partially polymerized into the polymers formed during the polymerization. (Meth)acrylic acid repeating units are subsequently formed in the polymer in the foaming by elimination of propene and isobutene. In a particular embodiment polymers produced from large proportions of these monomers or entirely from these monomers may also be used. The use of such polymerizable and/or polymerized comonomers that release blowing agents makes it possible, for example, to obtain particularly small and regular cells.

Particularly suitable blowing agents are tert-butyl (meth) acrylate, isopropyl (meth)acrylate, tert-butanol, isopropanol, tert-butyl methyl ether and poly(tert-butyl (meth)acrylate).

A further preferred group of rigid foams are obtained from PMI (polymethacrylimide) polymers.

Producing the polymer, for example in the form of a cast polymer, comprises initially producing monomer mixtures containing as their main constituents (meth)acrylic acid and (meth)acrylonitrile, preferably in a molar ratio between 2:3 and 3:2. It is additionally possible to employ further comonomers, for example esters of acrylic or of methacrylic acid, styrene, maleic acid or itaconic acid or anhydrides thereof or vinylpyrrolidone. The proportion of the comonomers should be not more than 30% by weight, preferably not more than 10% by weight, of the two main constituents. Small amounts of crosslinking monomers, such as for example allyl acrylate, may also be used. However, the quantities should preferably be not more than 0.05% by weight to 2.0% by weight.

The mixture for the copolymerization further contains blowing agents which undergo either decomposition or evaporation to form a gas phase at temperatures of about 150° C. to 300° C.

The mixtures may optionally be admixed with customary added substances. Suitable total amounts of added substances are for example 0% by weight to 20% by weight, 0% by weight to 10% by weight or 0% by weight to 5% by weight based on the monomer mixture. The customary added substances are distinct from the recited monomers, crosslinkers, blowing agents or initiators.

They include, inter alia, antistats, antioxidants, demoulding agents, lubricants, dyes, flow improvers, fillers, light stabilizers and organic phosphorus compounds, such as phosphites or phosphonates, pigments, release agents, weathering protectants and plasticizers. Further possible additions are flame retardants. In addition to halogen containing flame retardants, some of which contain antimony oxides, it is also possible to use phosphorus containing compounds. Phosphorus containing compounds are preferred due to the lower smoke gas toxicity in the event of a fire. The phosphorus compounds include, inter alia, phosphanes, phosphane oxides, phosphonium compounds, phosphonates, phosphites and/or phosphates. These compounds may be organic and/or inorganic in nature, such as for example phosphoric monoesters, phosphonic monoesters, phosphoric diesters, phosphonic diesters and phosphoric triesters and also polyphosphates.

Conductive particles, which prevent electrostatic charging of the foams, are another class of preferred added substances. These include, inter alia, metal particles and carbon black particles, which may also be present in the form of fibres, having a size in the range from 10 nm to 10 mm as described in EP 0 356 714 A1.

The polymerization is preferably effected by variants of bulk polymerization, for example the so-called chamber process described in the prior art, without being limited thereto.

The polymerization is advantageously carried out in block form in the presence of a radical polymerization initiator. In the production of flat blocks, for example in layers of up to 80 mm in thickness, the monomer mixture is located between two glass sheets, which are sealed at the edge in each case and form a kind of flat chamber. This flat chamber is surrounded by a water bath, which is set to the desired polymerization temperature.

The polymerization is preferably carried out in a shape-conferring vessel, in particular in the form of a chamber polymerization between two sheets, for example glass sheets. In the simplest case a rectangular tub may be concerned for example. Polymerization in such a tub later affords a sheet whose thickness has been determined by the fill level in the tub/the sheet spacing. However, more complex shapes are furthermore also conceivable for the vessel. The polymerization is preferably carried out at a temperature between 30° C. and 70° C. Employable initiators include not only well-known free-radical initiators, for example peroxides or azo initiators, but also redox systems or UV initiators. Polymerization temperatures below 40° C. apply particularly to these redox systems and UV initiators. UV initiators are initiated by irradiation with appropriate UV light, while redox initiators comprise two-component systems initiated by mixing the two components and the monomers.

The process for foaming according to the invention has the feature that the blowing agent containing polymer composition is foamed with a combination of microwave irradiation and thermal energy.

It was found that the polymer composition must be thermally heated at least 5° C., preferably at least 10° C., above the glass transition temperature $T_{gC}$ of the polymer composition.

It was found that, surprisingly, the blowing agent containing polymer composition should be heated with microwave irradiation and thermal energy above the glass transition temperature $T_{gP}$ of the pure polymer to obtain fine-celled rigid foams.

The supply of thermal energy may be effected via various heating apparatuses. It is preferable to employ ovens or heatable microwave apparatuses. Depending on the energy source suitable apparatuses include for example industrial ovens, hot air ovens, radiation ovens and heat treatment ovens.

Depending on the polymer composition the temperature during the supply of thermal energy should be between 100° C. and 250° C., preferably between 160° C. and 200° C. In particular the ambient temperature in the thermal heating means space should be between 100° C. and 250° C. since additional heating is effected through the combination with microwave radiation.

Both the foaming and the preceding polymerization may each be carried out in a plurality of temperature stages. In the polymerization a later increasing of the temperature can additionally increase conversion and thus reduce residual monomer content. During foaming a staged increasing of the foaming temperature may be used to influence cell distribution, cell size and the number of cells.

The process may optionally also be performed such that the polymerization proceeds only incompletely, in this case preferably to a conversion of at least 80%, and final end-polymerization is effected during the foaming. Such a process has the advantage that the relatively short polymer chains and the remaining monomers have a plasticizing effect at commencement of the foaming operation without any plasticizing compound remaining in the final foam. Thus in such an embodiment the polymerization and the foaming would in part be effected simultaneously at a single foaming temperature.

It has additionally been found that the temperature must be not more than 30° C., preferably not more than 25° C. and particularly preferably not more than 20° C. below the temperature required for purely thermal foaming of the same material. If the temperatures are below this limit homogeneous foaming does not take place.

It has further been found that, surprisingly, the polymer to be foamed must move relative to the microwave field during foaming to avoid field inhomogeneities. Either the polymer to be foamed may be moved in the case of a static microwave field or else the microwave field may be altered in the case of a spatially static polymer. If this is not done, inhomogeneously foamed foams are obtained.

Realizing a relative movement of the polymer sheet and the microwave field may be effected by subjecting the fixed polymer sheet to microwave radiation using movable hollow conductors. Microwave power output, distance and path length may be individually adapted to the geometry of the polymer sheet to produce a homogeneous foam of the desired density. Movement is effected using linear guideways or freely programmable handling systems.

A further preferred variant for improving homogeneity in terms of density distribution and cell morphology in microwave-based foaming of polymer sheets is to continuously vary the vibration modes of the microwave radiation using rotating mirrors. This reduces the formation of so-called hotspots which may result in local overheating and thus— due to excessive energy input—in an undesirably high degree of foaming associated with a locally insufficient density or even in collapsing of the foam cells.

A further optimization is effected by moving the polymer composition to be foamed relative to the microwave field. Here the polymer sheet (polymer composition to be foamed) is placed centrally and on the turntable of the microwave. The rotation of the turntable causes the polymer sheet to experience different radiation fields, thus reducing spot overheating. The turntable heats up over time, thus causing the bottom of the polymer sheet to undergo heating through conduction and the side edges to bulge upward. The high oven temperatures and the turbulence of the hot air in the microwave oven ensure that all regions of the polymer sheet are foamed. The polymer sheet has an even level. The partially nonuniform foaming of the polymer sheet results in small differences in the lengths of the edges of the foamed sheet and thus in warpage. Nevertheless, this placement of the polymer sheet coupled with a high oven temperature and a long foaming time results in a uniformly foamed sheet.

An additional option comprises placing the polymer sheet vertically on the turntable of the microwave and disabling the rotation function of the turntable. The alternative placement makes it possible to achieve a level foamed sheet. Slight deformations at the edges and small unevennesses at the sides may be apparent. The thus foamed sheet exhibits no cracks at the lateral edges or at the surface. Despite the altered position in the oven and thus a different radiation field from the microwave the sheet undergoes even foaming.

Suitable microwave apparatuses should provide a power of 0.1 kW/kg to 10 kW/kg (input power/kilogram of polymer to be foamed), preferably 0.8 kW/kg to 1.2 kW/kg, very particularly preferably 1 kW/kg and depending on the application should provide the option of moving the polymer to be foamed relative to the microwave field or the microwave field relative to the polymer. According to the invention the microwave apparatus must additionally be thermally heatable.

Application of the methods described above made it possible to shorten the foaming times for PMMA- and PMI-based foams from several hours to about 15 minutes.

The process according to the invention makes it possible to effect foaming of polymer sheets of various thicknesses.

It was further found that, surprisingly, for an identical formulation of the blowing agent containing polymer the cell size of the obtained foams was finer than in the case of purely thermal foaming of the same starting materials. A finer cell structure results in a lower resin absorption in the production of sandwich composites which is advantageous for the weight of component parts.

According to the invention a fine cell structure is to be understood as meaning average pore sizes of 20-300 µm, preferably between 50 and 280 µm, very particularly preferably between 60 and 250 µm.

The fine cellularity thus obtained is of great importance for various applications. In insulating applications the insulating effect of a foam generally increases with decreasing cell size for the same density and cell gas. In lightweight construction applications where a foam core is faced with resin-impregnated outer layers, resin absorption by the foam core should be minimal to save weight. The finer the cells of the closed-cell foam used therefor, the less resin can be absorbed.

The PMMA foams produced according to the invention further have a surprisingly high strength coupled with a surprisingly low brittleness and may therefore find use in lightweight construction for example. The good material properties further make it possible to eschew the use of plasticizers, for example relatively long-chain alkyl (meth) acrylates or phthalates, which according to present knowledge have a positive effect on flowability/foamability but at the same time have a negative effect on the mechanical properties, in particular the strength, of the PMMA foam.

EXAMPLES

Example 1

Polymer Composition to Be Foamed Moved Relative to Microwave Field

ROHACELL® is based on the monomers methacrylonitrile (MAN) and methacrylic acid (MAA) which are reacted to afford the desired product in a multistage process by addition of added substances. Depending on the formulation, a defined amount of blowing agent, crosslinker and stabilizers is added to the monomers. Blowing agents employed are for example formamide and various alcohols. In the next step the two monomers and the added substances are polymerized to afford a copolymer in a chamber process. Liquid monomer mixture is introduced between two glass sheets sealed with a rubber ring and secured. This resides in a water bath at about 50° C. for a certain time. The residence time depends on the sheet thickness and varies between 3-10 days. The exothermic free-radical reaction in which the initiators decompose due to the action of heat commences during this process. A methacrylonitrile-methacrylic acid copolymer is formed from the two monomers. The copolymer sheet is then heat-treated so that the residual monomers can react. After this step the large sheets are cut to size. The polymer sheets are cut to dimensions of 70×70×30 mm.

During the subsequent preheating the sheets are yellowish-orange to transparent. The preheating temperatures are about 160-180° C. and the preheating time is about 120 minutes. They are initially preheated to above the glass transition temperature in order that they become elastic. Once the sheets have achieved the desired preheating temperature the actual foaming follows.

To this end a sheet is introduced into an apparatus consisting of a thermal heating means and a microwave. The temperature of the thermal heating means is set to about 20° C. below the glass transition temperature of the polymer before foaming $T_{gP}$. By means of microwave radiation and thermal energy the blowing agent containing polymer composition is heated to at least the glass transition temperature of the polymer composition $T_{gC}$. To measure the temperature profile in the sheet this is provided with four bores before the temperature sensors are placed in the bores. One temperature sensor measures the temperature at the surface, one temperature sensor measures the temperature in the sheet interior and two further temperature sensors measure the temperature at the edge of the sheet. The sheet is placed on a turntable. The rotation of the sheet serves to reduce spot overheating which can occur due to the microwave radiation incident on the material. Infrared analyses may be used to demonstrate that the sheet is heated uniformly as a result of the rotation.

The cycle time for foaming was significantly shortened and the electromagnetic radiation allows the polymer sheet to be heated deep in its core.

Comparative Example 1C

Polymer Composition to Be Foamed Without Movement Relative to Microwave Field

A polymer sheet was produced according to example 1. This was placed in the centre of the microwave plate. The rotation function remained disabled. IR images reveal a plurality of hotspots and a nonuniform temperature distribution. Spot overheating has resulted in premature foaming.

Comparative Example 2

ROHACELL® Foaming Below $T_g$

It was investigated whether it is possible to foam ROHACELL® at a temperature below $T_g$ (205° C.).
Experimental Parameters
Sample dimensions; 50×50×23 mm
Oven temperature: 160° C.
Duration of heating: 180 min
Experimental Procedure/Process Steps
The sample is preconditioned at 23° C. and 50% atmospheric humidity for 48 hours.
Before commencement the oven is preheated to 160° C. for at least 60 min.
The sample is placed in the oven.
The time at which foaming commences is noted.

Since the chemical reaction is exothermic the temperature in the core was able to increase faster than the heat can be dissipated outward. Foaming commences only after 85 min. The increase in the core temperature allows further foaming of the inner regions. Thermal conductivity, and thus heat transfer, changes during the foaming. After about 180 min the entire sample was foamed. However, the expansion/enlargement of the foam block is relatively limited on account of the relatively low temperature, thus giving the foam block a very high end density.

Despite the limited foaming the experiment showed that the ROHACELL® was also foamable at temperatures below the glass transition temperature ($T_g$). However, the time required to commence the process is markedly longer than in the case of the customary foam temperatures above the glass transition temperature.

Example 3

Analysis of Cell Size (Cell Morphology) of ROHACELL®

To analyse the cell morphology of ROHACELL® three cube specimens cut out of a sheet having a density of about 71 kg/m$^3$ were analysed. The individual cubes have dimensions of 80×80×45 mm. Subsequently a strip of 5 mm in thickness was cut out of the individual cubes and broken in three places. The broken pieces are observed from above in the arrow direction and the cell size determined.

The sheet has the greatest volume in the middle and thus the density there is lowest. The number of cells and the cell size was determined from the individual parts of the strip. The average values of the cell size for the individual cube specimens in the x-, y- and z-axes are shown in the table below.

TAB 1

Average cell sizes in three-dimensional coordinate system

| Cube specimen number | Cube specimen 1 | Cube specimen 8 | Cube specimen 15 |
|---|---|---|---|
| Average cell size in x-direction | 116 µm | 135 µm | 117 µm |
| Average cell size in y-direction | 110 µm | 127 µm | 115 µm |
| Average cell size in z-direction | 158 µm | 202 µm | 168 µm |

It is apparent that the sample has an approximately equal cell size in the x- and y-directions while the cell size in the z-direction is greater. Cube eight has the lowest density and has the highest cell size in the z-direction. The cells are long, round and rod-shaped and are elongated in the z-direction. This cell shape is referred to as prolate and is not detectable in conventional foaming.

Example 4

Analysis of Cell Size (Cell Morphology) of ROHACRYL®

To analyse the cell morphology of ROHACRYL® analyses were performed analogously to example 3. This resulted in the following cell sizes:

TAB 2

| Average cell sizes in three-dimensional coordinate system | |
| --- | --- |
| Average cell size in x-direction | 166 μm |
| Average cell size in y-direction | 158 μm |
| Average cell size in z-direction | 158 μm |

The cell size is approximately equal in all 3 directions. An exceptional fine cellularity was thus demonstrated.

Comparative Example 4C

Analysis of Cell Size (Cell Morphology) of ROHACRYL® Conventional Foaming

To analyse the cell morphology of conventionally foamed ROHACRYL® analyses were performed analogously to example 3. This resulted in the following cell sizes:

TAB 3

| Average cell sizes in three-dimensional coordinate system | |
| --- | --- |
| Average cell size in x-direction | 451 μm |
| Average cell size in y-direction | 450 μm |
| Average cell size in z-direction | 377 μm |

The conventionally foamed Rohacryl® has a uniform cell size in all 3 directions but, in contrast to the cell sizes achieved in inventive example 4, has a substantially lower fine cellularity.

The invention claimed is:

1. A process for producing foams, the process comprising:
foaming a polymer composition comprising a blowing agent in an apparatus consisting of a thermal heating means and a microwave, which in combination heat the polymer composition above a glass transition temperature of the polymer composition $T_gC$ to produce a foam,
wherein during foaming the polymer composition is moved relative to a microwave field,
the polymer composition is heated at least 10° C. above the glass transition temperature of the polymer composition $T_gc$ with microwave irradiation and thermal energy,
the polymer composition comprises polymethacrylimide or polymethyl methacrylate; and
a temperature of the thermal heating means is not more than 30° C. below a glass transition temperature of the polymer Top before foaming.

2. The process for producing foams according to claim 1, wherein the microwave field is altered relative to the polymer composition.

3. The process for producing foams according to claim 1, wherein an ambient temperature in a thermal heating means space is between 100° C. and 250° C.

4. The process for producing foams according to claim 1, wherein the foam is a rigid foam having a density below 800 kg/m².

5. The process for producing foams according to claim 1, wherein the foam is a rigid foam having a density between 25 and 500 kg/m².

6. The process for producing foams according to claim 1, wherein the foam is a rigid foam having a density between 50 and 300 kg/m².

7. The process for producing foams according to claim 1, wherein the polymer composition comprises polymethacrylimide.

8. The process for producing foams according to claim 1, wherein the polymer composition comprises polymethyl methacrylate.

9. The process for producing foams according to claim 1, comprising continuously varying the vibration modes of a microwave radiation using rotating mirrors.

10. The process for producing foams according to claim 1, wherein the produced foams have an average pore size of 20 to 300 micrometers.

11. The process for producing foams according to claim 1, wherein the produced foams have an average pore size of 60 to 250 micrometers.

* * * * *